(12) United States Patent
Kumar et al.

(10) Patent No.: US 7,576,470 B2
(45) Date of Patent: Aug. 18, 2009

(54) MECHANICAL PACKAGING OF SURFACE ACOUSTIC WAVE DEVICE FOR SENSING APPLICATIONS

(75) Inventors: Sachin Kumar, Freeport, IL (US); James D. Cook, Freeport, IL (US); Gary O'Brien, Riverview, MI (US); Mohammed A J Qasimi, Freeport, IL (US); Richard C. Sorenson, Galloway, OH (US); Brian J. Marsh, Freeport, IL (US); Viorel V. Avramescu, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 93 days.

(21) Appl. No.: 11/799,346

(22) Filed: Apr. 30, 2007

(65) Prior Publication Data

US 2008/0265711 A1 Oct. 30, 2008

(51) Int. Cl.
*H01L 41/08* (2006.01)

(52) U.S. Cl. .................................. 310/313 R; 310/344

(58) Field of Classification Search ............ 310/313 R, 310/344, 346, 348
See application file for complete search history.

(56) References Cited

U.S. PATENT DOCUMENTS

| | | | |
|---|---|---|---|
| 4,317,372 A | 3/1982 | Hartemann | |
| 5,420,472 A * | 5/1995 | Cho et al. | 310/344 |
| 5,760,526 A * | 6/1998 | Anderson | 310/313 R |
| 6,003,378 A | 12/1999 | Scherr et al. | 73/703 |
| 6,571,638 B2 | 6/2003 | Hines et al. | 73/702 |
| 7,082,835 B2 | 8/2006 | Cook et al. | 73/715 |
| 7,109,635 B1 * | 9/2006 | McClure et al. | 310/313 R |
| 7,165,298 B2 | 1/2007 | Ehlers et al. | 29/25.35 |
| 2002/0125792 A1 | 9/2002 | Tabota | |
| 2006/0055286 A1 | 3/2006 | Ehlers et al. | |

FOREIGN PATENT DOCUMENTS

| | | |
|---|---|---|
| DE | 10215834 A1 | 11/2003 |
| EP | 1533601 A2 | 5/2005 |
| WO | WO 03/081195 A1 | 2/2003 |

OTHER PUBLICATIONS

Wafer Backside Coating of Die Attach Adhesives; T. Winster, C. Borkowski, Ablestik, Rancho Dominguez, CA; A. Hobby, DEK Printing Machines, Weymouth, Dorset, UK Oct. 1, 2006.

* cited by examiner

*Primary Examiner*—Mark Budd
(74) *Attorney, Agent, or Firm*—Kermit D. Lopez; Luis M. Ortiz; Tuesday A. Kaasch

(57) ABSTRACT

A method and apparatus, wherein a die is attached to a supporting base structure utilizing a rigid bond adhesive for a SAW (Surface Acoustic Wave) sensor. A rigid bond adhesive with a preferably high glass transition temperature (Tg) can be applied directly between the die and the die supporting structure in a pattern to eliminate time dependent gradual stress effects upon SAW sensor. The rigid bond adhesive can then be cured, which results in a high yield strength and a high young's modulus. The supporting base and the die material comprise a same co-efficient of thermal expansion in order to avoid die displacement over temperature.

16 Claims, 8 Drawing Sheets

MECHANICAL PACKAGING OF SURFACE ACOUSTIC WAVE DEVICE FOR SENSING APPLICATIONS

TECHNICAL FIELD

Embodiments are generally related to acoustic wave devices. Embodiments are also related to SAW (Surface Acoustic Wave) and BAW (Bulk Acoustic Wave) sensing devices. Embodiments are additionally related to mechanical packaging techniques and configurations for surface acoustic wave sensor devices.

BACKGROUND OF THE INVENTION

Acoustic wave sensors such as, for example SAW and/or BAW based sensors, can be utilized in a variety of sensing applications, such as, temperature and/or pressure sensing. Such surface wave sensors can also be utilized to detect the presence of substances, such as chemicals. Surface acoustic wave devices are typically fabricated using photolithographic techniques with comb-like interdigital transducers placed on a piezoelectric material. Surface acoustic wave devices may have either a delay line or a resonator configuration. One application where SAW sensors have been utilized effectively involves pressure and/or temperature sensing of vehicle tires.

Such sensors generally communicate with a vehicle so that the sensed pressure can be displayed to the operator when the vehicle is moving, i.e. the wheel rotating relative to the body of the vehicle. Such devices are generally relatively complex and expensive or alternatively are not particularly robust. One type of sensing system utilized in automobiles is the TPMS (Tire Pressure Monitoring System), which incorporates a sensor that is fixed to a body and hence a rotating electrical contact between the rotating wheel and the chassis is not required. In a TPMS application, a sensor rod is deflected by contact with the tire sidewall when the sidewall of the tire is deformed. This system provides an indication of low tire pressure, but is also not very robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

The majority of prior art TPMS systems require batteries to transmit readings from air pressure and temperature sensors. The batteries have a limited lifespan and suffer from impaired performance under the temperature conditions often experienced by automotive components, thereby reducing the reliability of such systems. In addition, batteries contain chemicals that can have an adverse impact on the environment. Further, the weight of the battery itself can cause distortion of tire shape at high speeds, causing loss of air pressure and resultant safety problems. Hence, a battery-less system is more desirable.

Tire pressure sensors have been implemented based on the assembly of a configuration in which a SAW die floats on a base to which the SAW die is eventually wire bonded. The SAW die is highly sensitive to small stresses and even displacements involving microscopic dimensions such as nanometers, micrometers etc., which can easily occur either due to CTE (Coefficient of Thermal Expansion), mismatch of die, packaging materials and adhesive utilized to secure the die to a supporting structure at different temperatures or due to time-dependent adhesive properties at a constant temperature that interact with the location of that adhesive with respect to the die and the die supporting structure. These issues can result in sensor drift over a period of time at different temperatures resulting in inaccurate and unreliable operations for a given sensing application.

Referring to FIG. 1, a side view of a SAW-based sensor 100 utilizing a prior art die-attachment method is illustrated. The SAW-based sensor 100 utilizes four dots of a relatively soft adhesive 110 for attaching the die 130 to the die supporting base structure 140. The adhesive 110 is then cured to complete the process. The soft adhesive 110 offers a relatively lower Young's modulus and lower yield strength after curing than a hard or rigid bond adhesive and possesses a time dependent property (e.g. visco-elastic creep) or a combination of properties, which results in a gradual stress on the SAW device 100 resulting in a change (drift) of output over a period of time. These adhesive related changes can result in gradual stress effects on the SAW die 130 at a given temperature. The SAW sensor 100 is sensitive to these stress changes, resulting in an output drift from the sensor 100 and poor data.

Referring to FIG. 2, a top view of the SAW-based sensor 100 utilizing a prior art die-attachment method is illustrated. The SAW-based sensor 100 includes four dots of soft adhesive 110, die 130, a die supporting base structure 140 and a die supporting ledge 150. The soft adhesive dots 110 as depicted in FIG. 1 exert a gradual stress on the die 130 primarily from the sides of the sensor 100. Such a configuration causes the sensor 100 to drift over a period of time resulting in inaccurate and unreliable sensing operations and results.

Referring to FIG. 3, a graph 200 of sensor drift versus time utilizing soft adhesive is illustrated. As shown in graph 200 of FIG. 3, the sensor drift is high when a soft adhesive is utilized for attaching the die 130 to the die supporting base 140. Graph 200 generally plots frequency drift data from initial readings for three resonators (i.e., TSAW, RSAW, and PSAW) and their difference frequencies Fp and Ft which are utilized to calculate pressure and temperature.

Based on the foregoing it is believed that a need exists for an improved design, which can incorporate a rigid bond adhesive for die attachment to a supporting base structure for sensing applications for the achievement of enhanced sensor performance. It is believed that by utilizing the sensor packaging method described in greater detail herein, stress effects in the resulting SAW sensor device can be eliminated.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved acoustic wave sensor apparatus and method of producing the same.

It is also an aspect of the present invention to provide for an improved SAW and/or BAW sensor apparatus and method of producing the same.

It is another aspect of the present invention to provide for an improved tire pressure sensor apparatus for monitoring vehicle tire pressure.

It is a further aspect of the present invention to provide for an improved mechanical packaging method for implementing an acoustic wave sensor apparatus for sensing applications.

The aforementioned aspects and other objectives and advantages can now be achieved as described herein. A method and apparatus are disclosed in which a die is attached to a supporting base structure utilizing a rigid bond adhesive in order to provide and package a SAW sensor. The rigid bond adhesive (which can also be referred to as a "hard adhesive") possesses a high Young's modulus and a high yield strength after curing which are much higher than properties offered by a soft adhesive. The rigid bond adhesive with a preferably high glass transition temperature (Tg) can be applied directly between the die and the die supporting structure in a pattern to eliminate time dependent gradual stress effects in the resulting SAW sensor. The rigid bond adhesive can then be subject to a curing operation, which results in a high yield strength and a high young's modulus. The supporting base and the die material preferably possess the same co-efficient of thermal expansion in order to avoid die displacement over temperature. The rigid bond adhesive can also be applied directly between the die and any structure meant to restrict the movement of the die in a pattern to eliminate time dependent gradual stress effects in the resulting SAW sensor.

Thus, the surface acoustic wave device can be positioned initially, while still allowing it to flex with pressure via the adhesive located beneath the surface acoustic wave die. The surface acoustic wave die can be composed of one or more inter digital transducers formed upon a piezoelectric substrate. The pressure sensitive resonator is preferably placed in the area between die support ledges in order to maximize deflection, whereas other resonators such as temperature resonators can be placed outside the die support ledges in order to minimize pressure effects.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
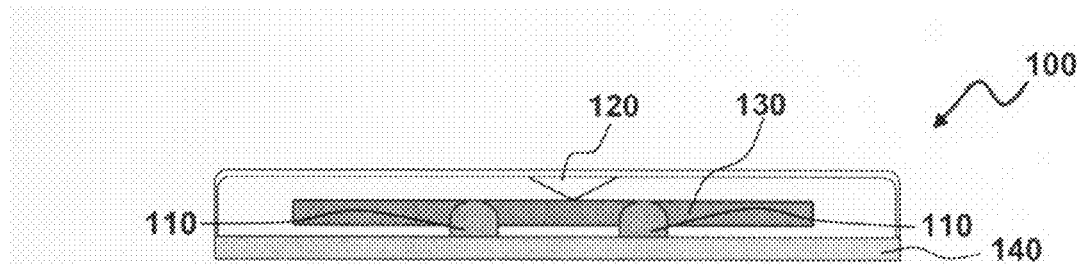
FIG. 1 illustrates a side view of a SAW-based sensor utilizing prior art die attach method.
Figure 2:
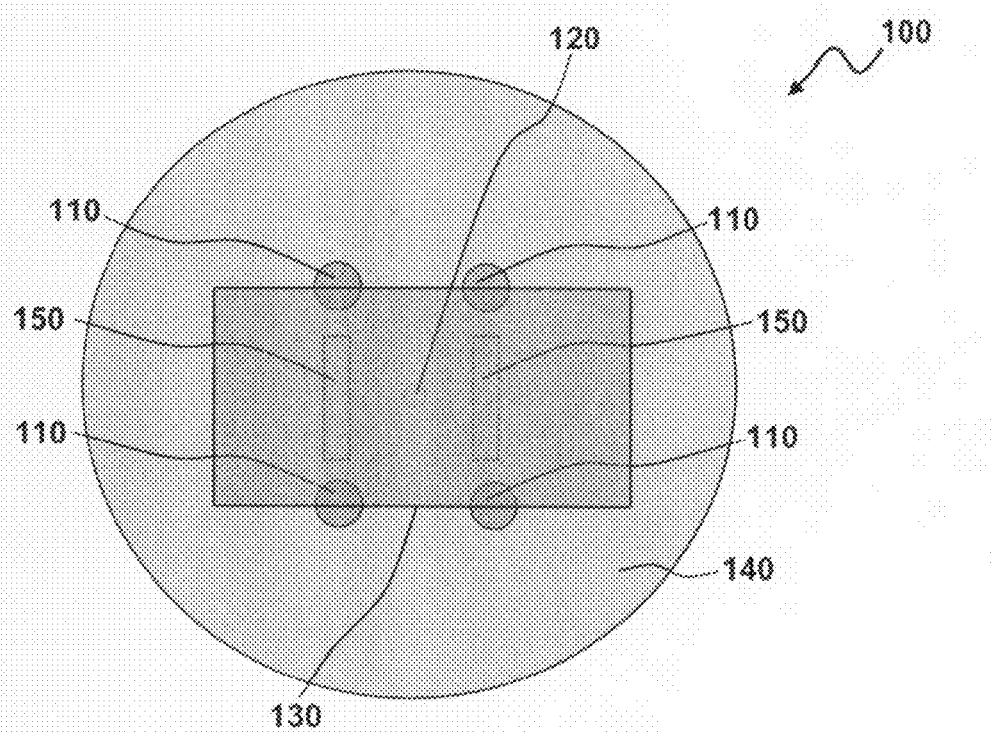
FIG. 2 illustrates a top view of a SAW-based sensor utilizing prior art die attach method.
Figure 3:
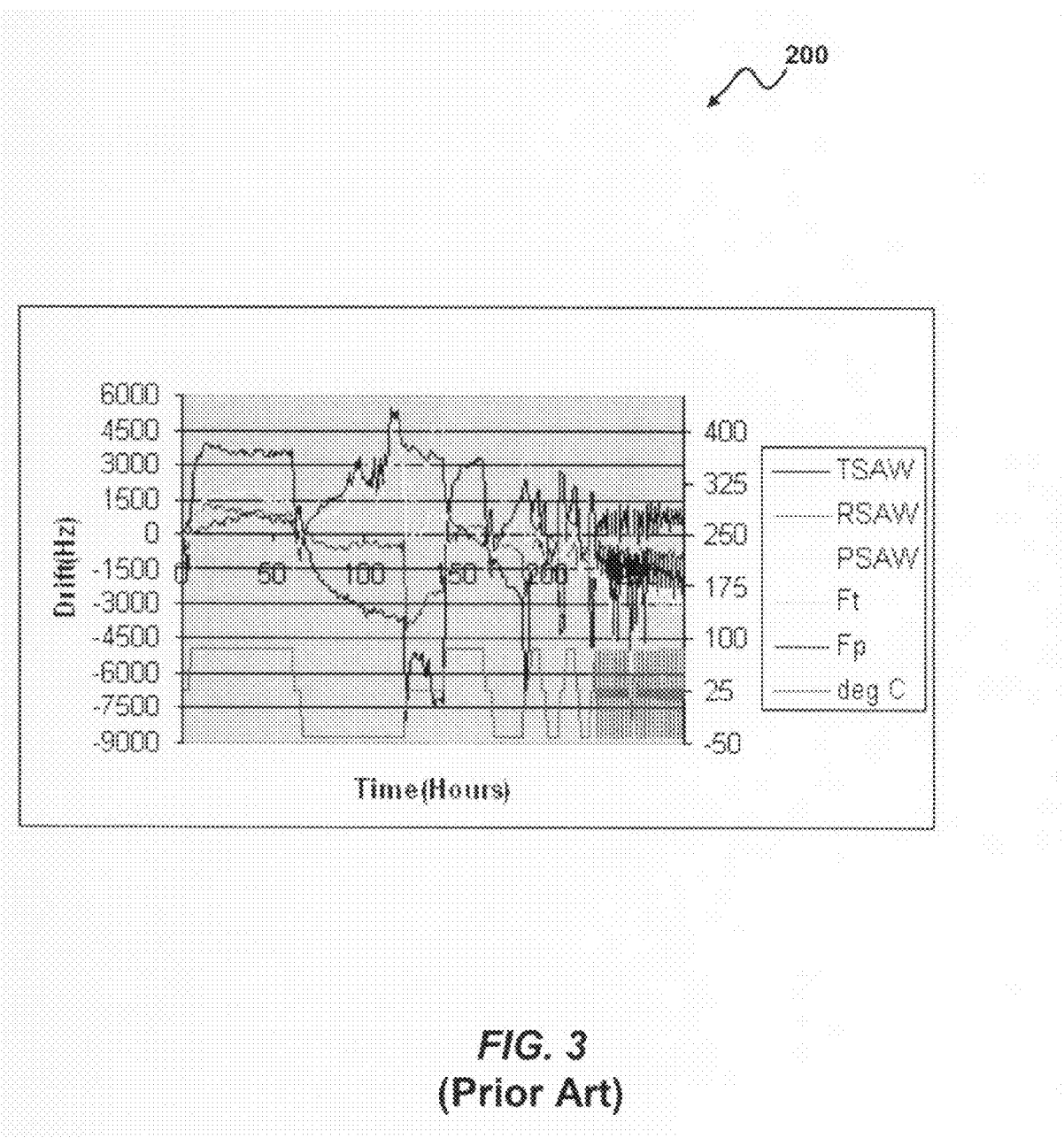
FIG. 3 illustrates a graphical representation of a sensor drift versus time with prior art die attach method utilizing soft adhesive.
Figure 4:
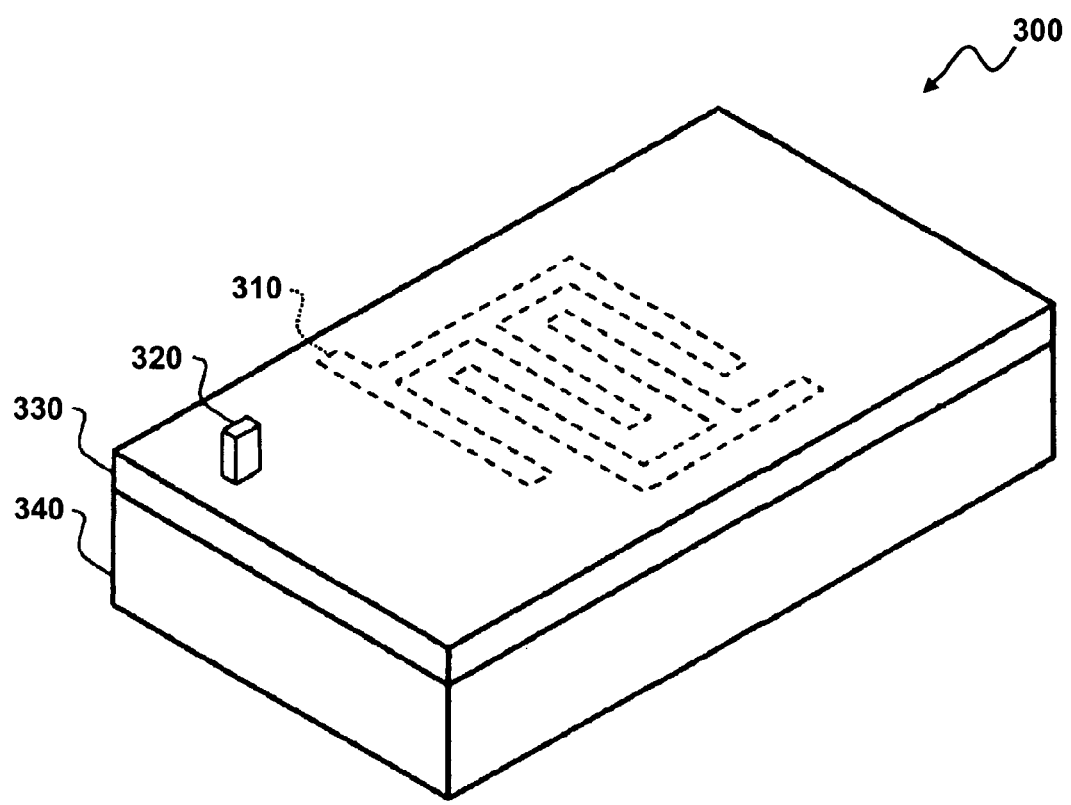
FIG. 4 illustrates a perspective view of an interdigital surface wave device which can be implemented, in accordance with a preferred embodiment.

Referring to FIG. 4, a perspective view of an interdigital surface wave device 300 is illustrated, which can be implemented in accordance with a preferred embodiment. The surface wave device 300 depicted in FIG. 4 generally includes an interdigital transducer (IDT) 310 formed on a piezoelectric substrate 340. The surface wave device 300 can be implemented in the context of a sensor chip. The interdigital transducer 310 can be configured in the form of an electrode. The antenna 320 is generally connected to IDT 310.

A coating 330 can be utilized such that a particular species to be measured is absorbed by the coating 330, thereby altering the acoustic properties of the interdigital surface wave device 300. Various selective coatings can be utilized to implement the coating 330. A change in acoustic properties can be detected and utilized to identify or detect the substance or species absorbed and/or adsorbed by the coating 330. A change in acoustic properties can also be achieved by inducing strain in the IDT region. Such strains can be induced by different parameters such as, for example, pressure, temperature, torque etc. or a combination of these.

Figure 5:
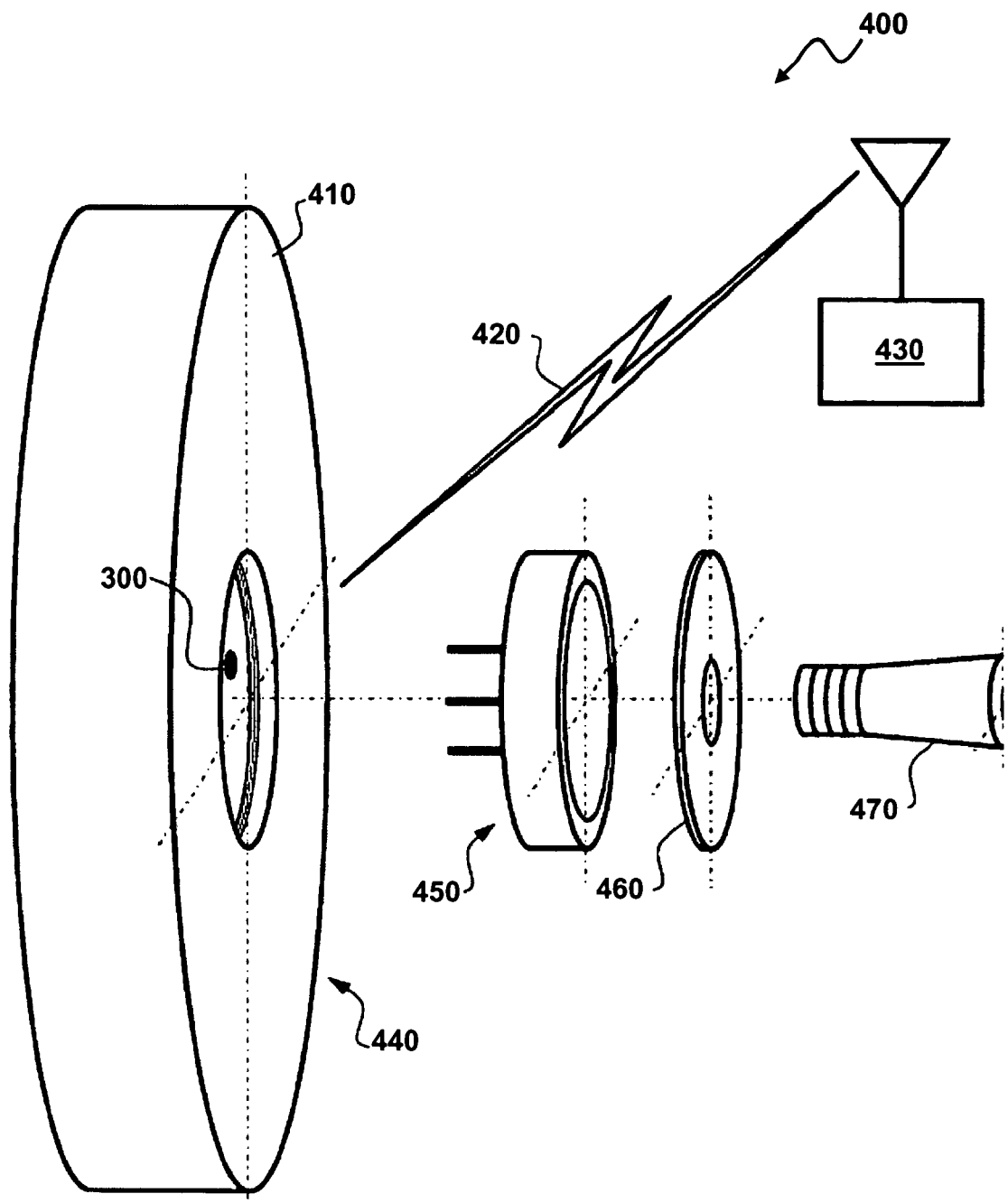
FIG. 5 illustrates an exploded view of a tire pressure sensor system which can be implemented, in accordance with a preferred embodiment.

Referring to FIG. 5, an exploded view of a tire sensor system 400 is illustrated which can be implemented, in accordance with a preferred embodiment. System 400 can be implemented in the context of a tire 410 associated with a drum-type brake. It can be appreciated, however, that system 400 can be implemented in the context of other brake systems, such as disk brakes. Tire 410 includes a tire rim 440. System 400 includes a brake drum 450, which can interact with a backing plate 460, which in turn surrounds a vehicle axle 470.

System 400 also includes an interdigital surface wave device 300, which is shown in greater detail in FIGS. 6-9. System 400 is generally utilized to monitor the pressure and/or temperature of tire 410 by locating the interdigital surface wave device 300 at a particular location on tire 410. A wireless signal (e.g., radio frequency, low frequency, etc.) can be transmitted to interdigital surface wave device 300 from a transmitter/receiver 430, which is preferably located within an automobile and/or elsewhere. The signal excites the interdigital surface wave device 300, which produces frequencies indicative of the pressure and/or temperature of tire 410.

Figure 6:
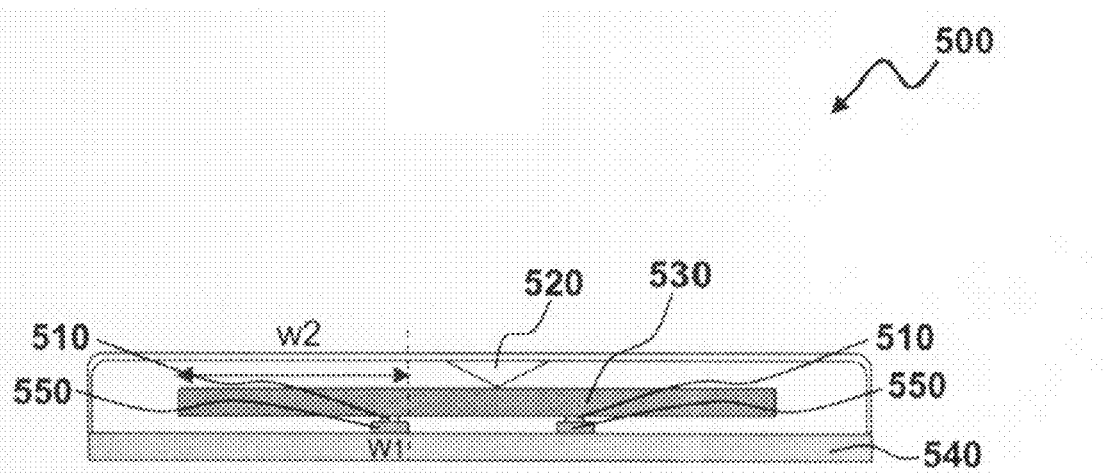
FIG. 6 illustrates a side view of a SAW-based sensor which can be implemented, in accordance with a preferred embodiment.

Referring to FIG. 6 a side view of a SAW-based sensor 500 is illustrated which can be implemented, in accordance with a preferred embodiment. The SAW-based sensor 500 generally includes a die 530, which is attached to a die supporting structure comprising a die-supporting structure 540 and base ledges 550. The term "ledges" as utilized herein generally refers to any part of the die-supporting structure 540 an which the die 530 rests when the die 530 is attached to the die supporting structure 540 utilizing an adhesive 510. The material of the die supporting structure 540 and die 530 can possess similar values (e.g., but ideally the same) of temperature coefficient of expansion in order to avoid die displacements over temperature. The die 530 can then be affixed to the supporting structure 540 by the rigid bond adhesive 510. The rigid bond adhesive 510 can be placed along a narrow area lying substantially along a preferred direction while minimizing thermally-induced stresses within the rigid bond adhesive 510 and the supporting base 540. The rigid bond adhesive 510 can be provided for securing the surface acoustic wave die 530 to the die supporting structure 540. The adhesive 510 can be placed on a location above die support ledges 550, such that the surface acoustic wave die 530 can thereafter be pressed into the rigid bond adhesive 510. Note that the width of the die supporting ledges 550 can be less than, equal to or greater than the length of die 530 outside the pressure sensitive resonator (not shown in FIG. 6)

The die supporting ledges 550 can be of any shape, such as, for example, rectangular, square, triangular, circular and polygon. The adhesive 510 can be cured so that the resulting component provides a high yield strength and a high young's modulus. Pressure can be applied to the pressure application structure 520, which is a part of the package cover (not shown). The pressure application structure 520 can be of any shape such as, for example a point, circular/spherical, flat/rectangular/square or any other shape at the point of die contact. The pressure application structure 520 can also be affixed to the die 530 utilizing rigid bond adhesive 510 at the point of mutual contact. The surface acoustic wave die 530 is generally configured to include one or more interdigital transducers formed upon a piezoelectric substrate surrounded by a base and a cover (not shown). An example of such an interdigital transducer is the interdigital surface wave device 300 depicted in FIG. 4 herein. Note that the acoustic wave die 530 can be located, for example, in a position proximate, near or attached to a tire wheel assembly such as tire 410 depicted in FIG. 5.

Figure 7:
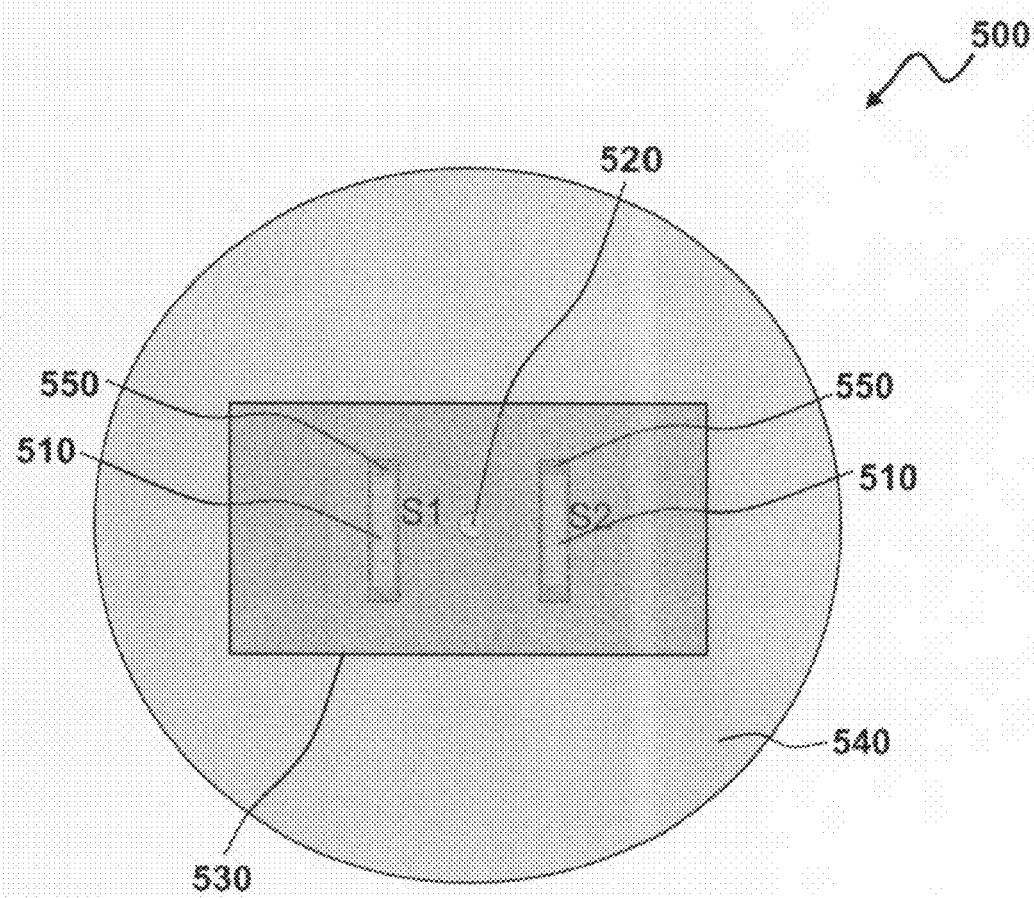
FIG. 7 illustrates a top view of a SAW-based sensor which can be implemented, in accordance with a preferred embodiment.

Referring to FIG. 7 a top view of a SAW-based sensor 500 is illustrated which can be implemented, in accordance with a preferred embodiment. Note that in FIGS. 6-9, identical or similar parts or elements are generally indicated by identical reference numerals. As indicated in FIG. 7, the SAW-based sensor 500 includes a die supporting structure comprising a die supporting base 540 and base ledges 550 for the die to deflect, which in turn can be provided as an integral part of the base 540, and adhesive 510. The adhesive 510 can be applied directly on the ledges for die attachment which can be used for to achieve enhanced sensing applications and performances. The rigid bond adhesive 510 eliminates inherent time dependent property changes at different temperatures. The rigid bond adhesive 510 generally possesses a high young's modulus, a high yield strength after curing, and has a high Glass Transition Temperature (Tg). The rigid bond adhesive 510 may either be applied only on one side S1 or S2 or both sides S1 and S2 as indicated in FIG. 7. The length of the die supporting ledges 550 can be less than, equal to, or greater than the width of die 530 (not shown in FIG. 7)

Figure 8:
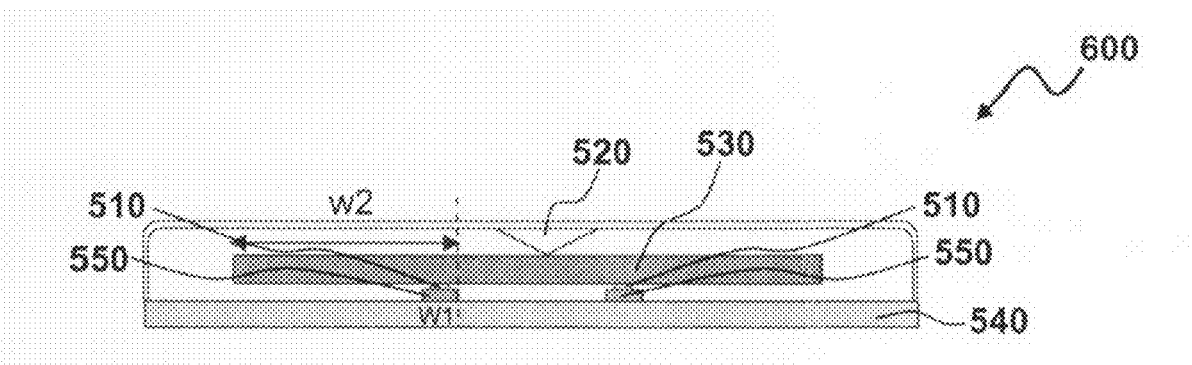
FIG. 8 illustrates a side view of a SAW-based sensor which can be implemented, in accordance with an alternate embodiment.

Referring to FIG. 8, a side view of a SAW-based sensor 600 is illustrated, which can be implemented, in accordance with an alternate embodiment. The application of rigid bond adhesive 510 directly between the SAW die 530 and the supporting structure 540 eliminates adhesive-related stress effects in the SAW sensor 600. The SAW-based sensor 100 utilizes four dots of a relatively rigid bond adhesive 510 for attaching the die 530 to the die supporting base structure 540. Die supporting ledges 550 and adhesive 510 can be of approximately the same height above a top surface of the die supporting base 540. The width of the die supporting ledges 550 can be less than, equal to or greater than the length of die 530 outside pressure sensitive resonator (not shown in FIG. 8).

Figure 9:
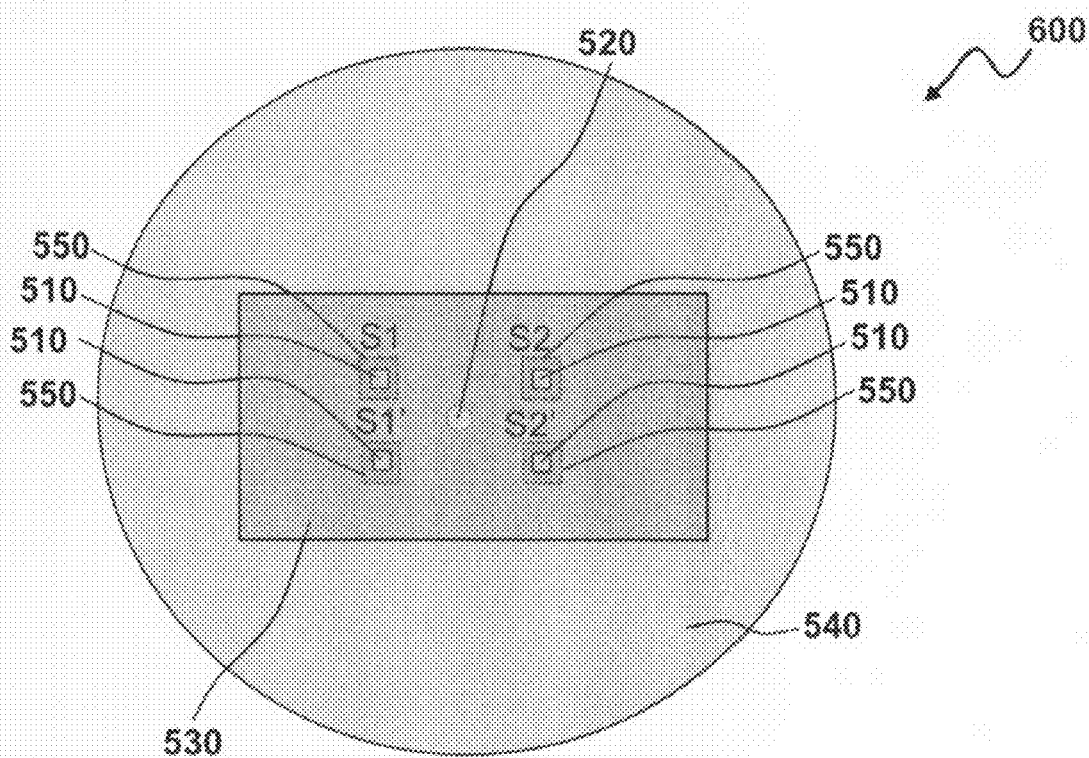
FIG. 9 illustrates a top view of a SAW-based sensor which can be implemented, in accordance with an alternate embodiment.

Referring to FIG. 9, a top view of a SAW-based sensor 600 is illustrated which can be implemented, in accordance with an alternate embodiment. Note that in FIGS. 6-9, identical or similar parts or elements are generally indicated by identical reference numerals. As indicated in FIG. 9, the SAW-based sensor 500 includes a die supporting base 540, four dots of rigid bond adhesive 510, die 530 and die supporting ledges 550. Note that although four dots are described with respect to the rigid bond adhesive 510, it can be appreciated that fewer or more such "dots" can be provided depending upon design considerations. The number "four" is thus not considered a limiting feature of the embodiments but is discussed herein for general illustrative purposes only. The adhesive 510 can be applied directly between the die 530 and the die supporting structure 540 for die attachment and can be utilized to achieve enhanced sensor performance during sensing applications. The rigid bond adhesive 510 can be applied on sides S1 & S1' or S2 & S2' or S1 & S2' or S2 & S1' or on all four sides S1, S1'S2 & S2' as indicated in FIG. 9. The adhesive 510 can be placed on a location above die support ledges 550, such that the surface acoustic wave die 530 can thereafter be pressed into the rigid bond adhesive 510. The die supporting ledges 550 can be of any shape, such as, for example, rectangular, square, triangular, circular and polygon. The distance between the die supporting ledges 550 over die width can be less than, equal to, or greater than the width of the die 530 (not shown in FIG. 9)

Figure 10:
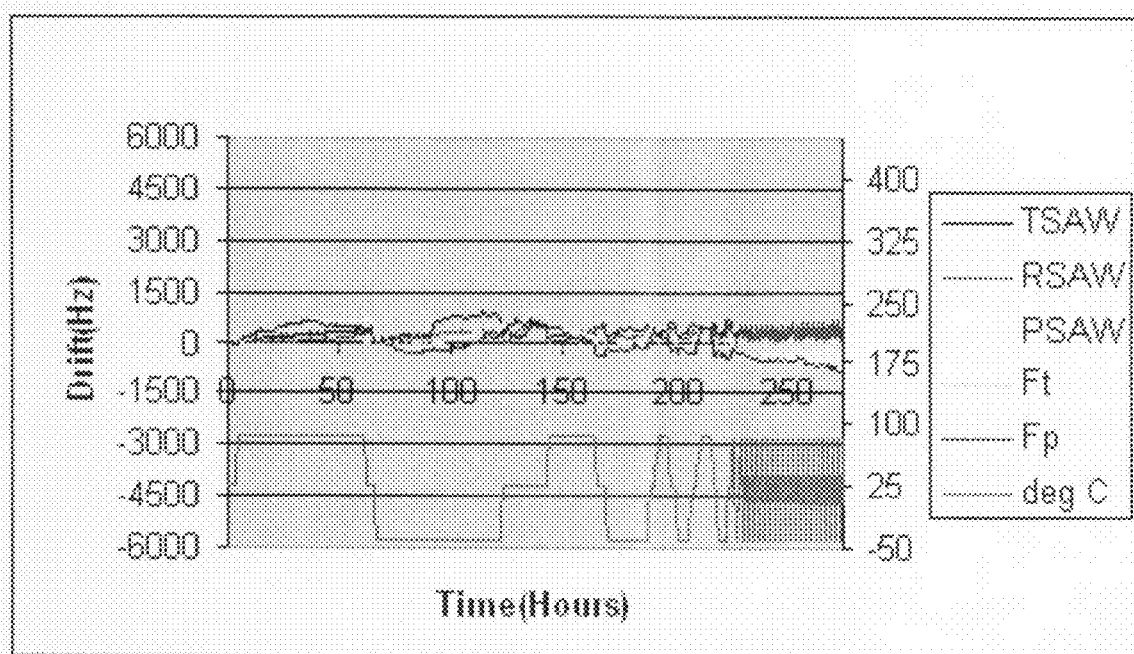
FIG. 10 illustrates a graph depicting data representing sensor drift versus time utilizing a rigid bond adhesive, in accordance with a preferred embodiment.

Referring to FIG. 10, a graph 700 plotting sensor drift data versus time utilizing a soft adhesive is illustrated, in accordance with one possible embodiment. As indicated in graph 700, sensor drift is not present when a rigid bond adhesive 510 is utilized for attaching the die 530 to the die supporting structure 540. In the sample graph 700, sensor drift data is measured in Hz and time data in hours.

Figure 11:
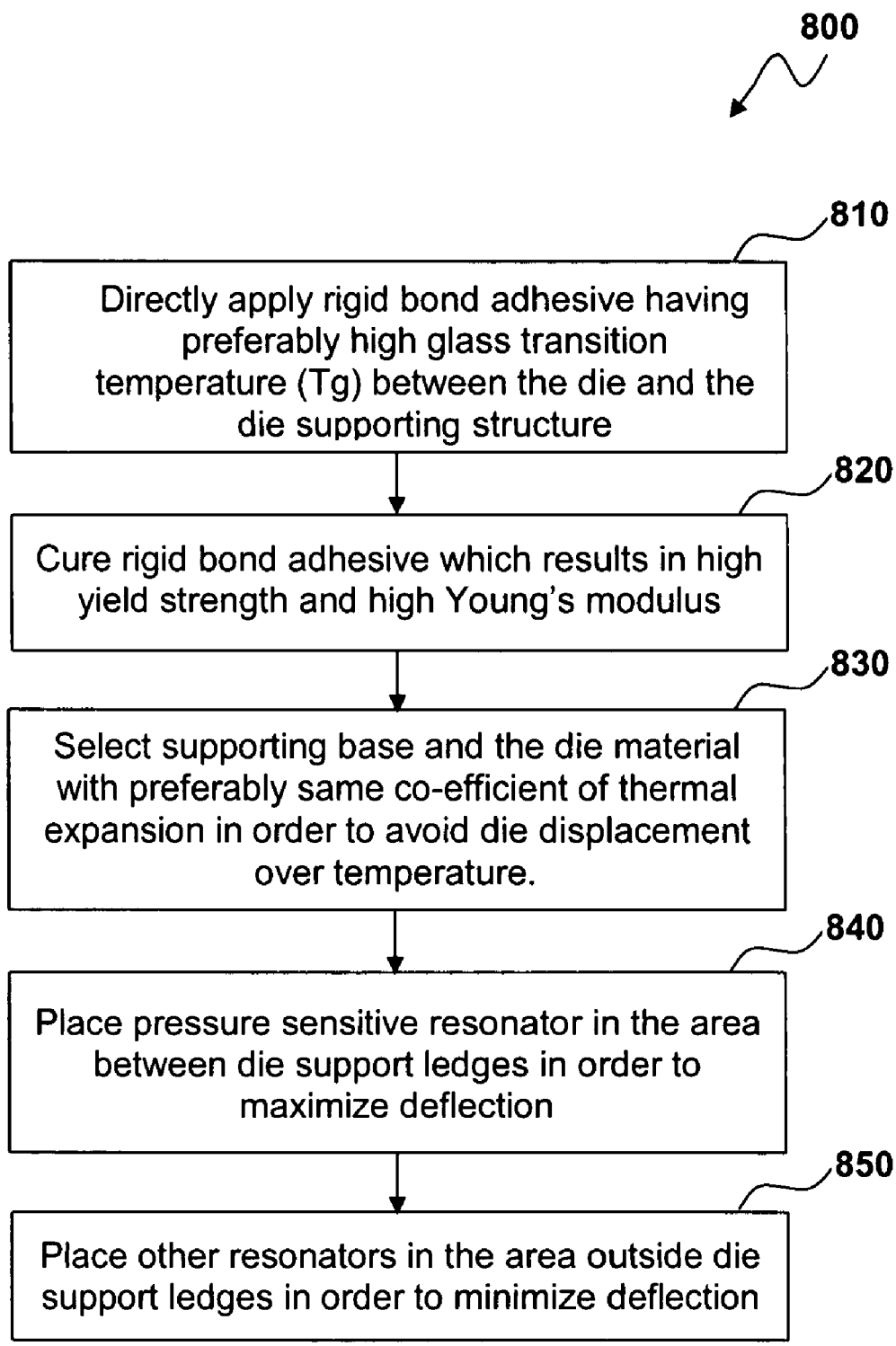
FIG. 11 illustrates a detailed flow chart of operations illustrating logical operational steps of a mechanical packaging method for providing a surface acoustic wave device for sensing applications, in accordance with a preferred embodiment.

FIG. 11 illustrates a detailed flow chart of operations illustrating logical operational steps of a mechanical packaging method 800 for providing a surface acoustic wave sensing device, in accordance with a preferred embodiment. As indicated at block 810, the rigid bond adhesive 510 with preferably high glass transition temperature (Tg) can be applied directly between the die 530 and the die supporting structure 540. Next, as depicted at block 820, the rigid bond adhesive 510 can be cured, which results in a high yield strength and high young's modulus. Thereafter, as illustrated at block 830, the supporting base 540 and the die material 530 can be selected with the same co-efficient of thermal expansion in order to avoid die displacement over temperature. The pressure sensitive resonator of the die can then be placed in the area between the die support ledges 550 in order to maximize deflection, as described at block 840. Finally as indicated at block 550, other resonators can be placed in the area outside die support ledges 550 in order to minimize deflection.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A surface acoustic wave sensor apparatus, comprising:
at least one surface acoustic wave die disposed on a supporting base/structure having a plurality of die support ledges formed therein upon which said at least one surface acoustic wave die is; and
a rigid bond adhesive located directly between said at least one surface acoustic wave die and said plurality of die supporting ledges in a pattern to eliminate time dependent gradual stress effects, wherein said rigid bond adhesive is thereafter cured in order to attach said at least one surface acoustic wave die to said supporting base in order to form said surface acoustic wave sensor.

2. The apparatus of claim 1 wherein:
said surface acoustic wave sensor includes at least one interdigital transducer (IDT) formed upon a piezoelectric substrate; and
an antenna is integrated with said surface acoustic wave sensor, wherein said antenna receives at least one signal, which excites said at least one IDT to produce at least one frequency output for temperature and/or pressure effect analysis thereof.

3. The apparatus of claim 1 wherein said at least one surface acoustic wave die and said supporting base include a same co-efficient of thermal expansion in order to avoid die displacement over temperature relative to the die supporting base/structure and/or pressure application point which results in sensor output change.

4. The apparatus of claim 1 wherein said at least one packaged surface acoustic wave die is located on a tire or tire wheel assembly.

5. The apparatus of claim 1 wherein said rigid bond adhesive is selected from a material that provides a high young's modulus, a high yield strength after curing and which possesses a preferably high glass transition temperature (Tg).

6. The apparatus of claim 5 wherein said rigid bond adhesive eliminates time dependent gradual stress effects upon said at least one surface acoustic wave die.

7. The apparatus of claim 1 further comprising;
a pressure sensitive resonator located in an area between said plurality of die support ledges in order to maximize deflection; and
a plurality of other resonators positioned in an area external said plurality of die support ledges in order to minimize pressure effects upon said plurality of other resonator.

8. A surface acoustic wave sensor apparatus, comprising:
at least one surface acoustic wave die disposed on a supporting base/structure having a plurality of die support ledges formed therein upon which said at least one surface acoustic wave die is; and
a rigid bond adhesive located directly between said at least one surface acoustic wave die and said plurality of die supporting ledges in a pattern to eliminate time dependent gradual stress effects, wherein said rigid bond adhesive is thereafter cured in order to attach said at least one surface acoustic wave die to said supporting base in order to form said surface acoustic wave sensor, wherein said surface acoustic wave sensor includes at least one interdigital transducer (IDT) formed upon a piezoelectric substrate; and
an antenna integrated with said surface acoustic wave sensor, wherein said antenna receives at least one signal, which excites said at least one IDT to produce at least one frequency output for temperature or pressure effect analysis thereof.

9. The apparatus of claim 8 wherein said at least one surface acoustic wave die and said supporting base include a same co-efficient of thermal expansion in order to avoid a die displacement over temperature relative to a die supporting base/structure and/or a pressure application point which results in a sensor output change.

10. The apparatus of claim 8 wherein said at least one surface acoustic wave sensor is located in association with a tire or a tire wheel assembly.

11. A surface acoustic wave sensor apparatus, comprising:
at least one surface acoustic wave die;
an adhesive applied directly to at least one side of said at least one surface acoustic wave die and at least one structure for restricting the movement of said at least one surface acoustic wave die in a pattern that eliminates time dependent gradual stress effects in order to form said surface acoustic wave sensor apparatus.

12. The apparatus of claim 11 wherein said adhesive eliminates time dependent gradual stress effects primarily from at least one side of said at least one surface acoustic wave die.

13. The apparatus of claim 12 wherein said adhesive comprises a soft adhesive or a hard adhesive.

14. The apparatus of the claim 1 further comprising a coating placed over said surface acoustic wave die so as to alter acoustic properties of said surface acoustic wave die in order to detect a substance absorbed by said coating.

15. The apparatus of the claim 8 further comprising a coating placed over said surface acoustic wave die so as to alter acoustic properties of said surface acoustic wave die in order to detect a substance absorbed by said coating.

16. The apparatus of the claim 11 further comprising a coating placed over said surface acoustic wave die so as to alter acoustic properties of said surface acoustic wave die in order to detect a substance absorbed by said coating.

* * * * *